(12) United States Patent
Harteveld et al.

(10) Patent No.: US 8,246,843 B2
(45) Date of Patent: Aug. 21, 2012

(54) PROCESS AND DEVICE FOR THE SEPARATION OF OIL/WATER MIXTURES

(75) Inventors: Wouter Koen Harteveld, Amsterdam (NL); Peter Veenstra, Amsterdam (NL); Paulus Henricus Joannes Verbeek, Rijswijk (NL)

(73) Assignee: Shell Oil Company, Houston, TX (US)

( * ) Notice: Subject to any disclaimer, the term of this patent is extended or adjusted under 35 U.S.C. 154(b) by 345 days.

(21) Appl. No.: 12/595,918

(22) PCT Filed: Apr. 16, 2008

(86) PCT No.: PCT/EP2008/054592
§ 371 (c)(1),
(2), (4) Date: Feb. 18, 2010

(87) PCT Pub. No.: WO2008/128935
PCT Pub. Date: Oct. 30, 2008

(65) Prior Publication Data
US 2010/0206822 A1 Aug. 19, 2010

(30) Foreign Application Priority Data
Apr. 18, 2007 (EP) ..................................... 07106428

(51) Int. Cl.
*B01D 17/038* (2006.01)
(52) U.S. Cl. ....................... 210/788; 210/137; 210/512.1
(58) Field of Classification Search .................. 210/137, 210/512.1, 788
See application file for complete search history.

(56) References Cited

U.S. PATENT DOCUMENTS
5,904,840 A 5/1999 DiBella ........................... 210/85
2003/0168391 A1 9/2003 Tveiten .......................... 210/188

FOREIGN PATENT DOCUMENTS
| EP | 1600215 | 11/2005 |
| WO | WO 2003033872 | 4/2003 |
| WO | WO 2004080566 | 9/2004 |
| WO | WO 2007074379 | 7/2007 |
| WO | WO 2008128935 A2 * | 10/2008 |

OTHER PUBLICATIONS

Written Opinion of the International Searching Authority for PCT/EP2008/054592, Jun. 2008.*

* cited by examiner

*Primary Examiner* — David A Reifsnyder

(57) ABSTRACT

The invention describes a process for the separation of an oil/water mixture into an oil rich phase and a water rich phase using an inline separation device, an inlet, a vortex generating chamber, a central separation chamber, and an outlet and providing an oil rich phase discharge pipe and a water rich phase discharge pipe. The process further also comprising a) the provision of an additional tangential or axial inlet into the vortex generating chamber or the central separation chamber and introducing an additional amount of oil/water mixture tangentially and/or axially into the vortex generating chamber or the central separation chamber, or b) adjusting the vortex generating means to control the rotation of the vortex, or a combination of a) and b). The invention further relates to a device for carrying out the above process and to the use of such a device in the separation of oil/water mixtures.

12 Claims, 3 Drawing Sheets

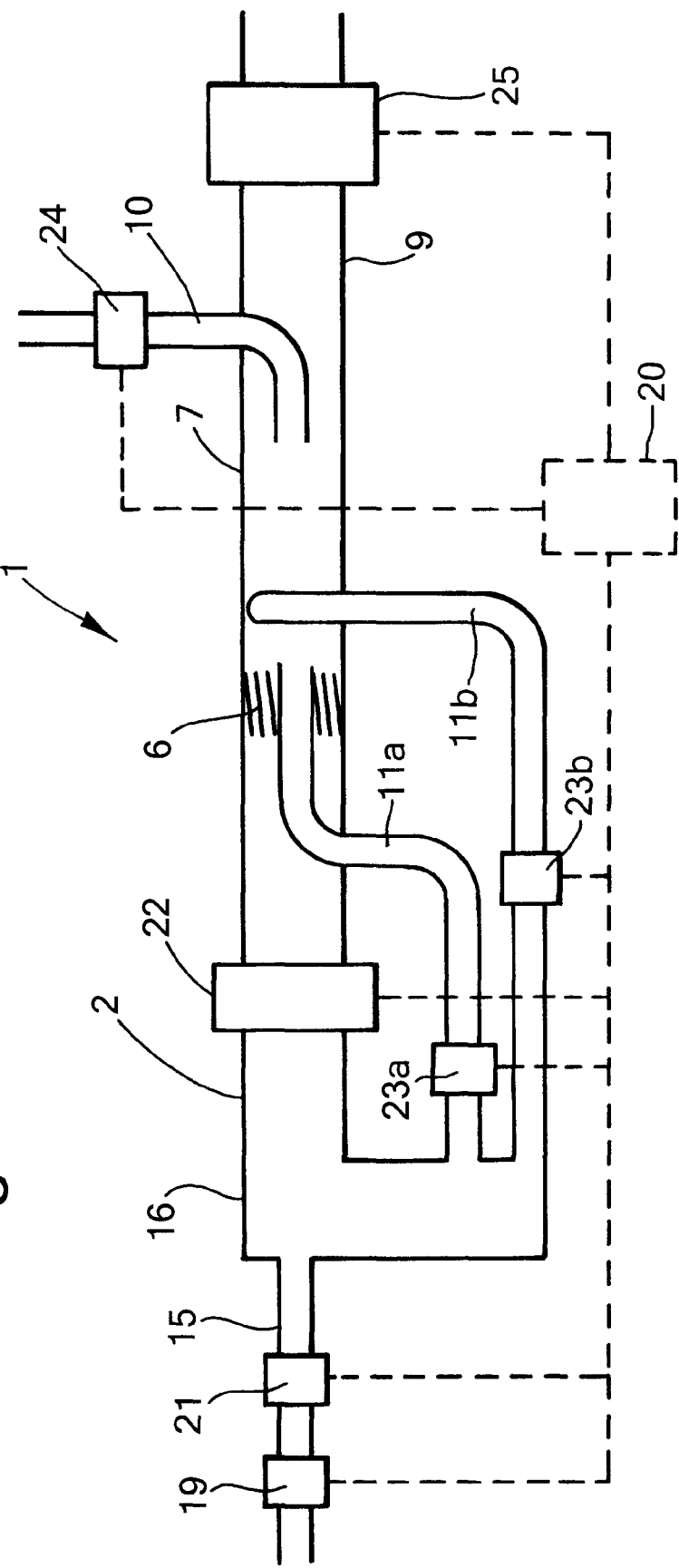

PROCESS AND DEVICE FOR THE SEPARATION OF OIL/WATER MIXTURES

PRIORITY CLAIM

The present application claims priority of EP Patent Application No. 07106428.1 filed 18 Apr. 2007.

FIELD OF THE INVENTION

The present invention concerns a process and a device for the separation of oil/water mixtures, especially the bulk separation of water from oil/water mixture.

BACKGROUND OF THE INVENTION

In producing oil from subsurface reservoirs, generally a mixture of oil, water, gas and sand (solids) comes to the surface. It is essential that these components are separated into their single constituents. Separation of the gas phase and the solid phase is relatively easy, based on the relatively large differences in specific weight. The separation of two liquid phases is more difficult as the difference in specific weight are usually relatively low, while all kinds of mixtures may consist including stable dispersions. In the case of (crude) oil/water mixtures the differences in specific weight are often fairly small.

Traditionally oil/water separations are done in vessels where the separation is done by gravity. See for instance US 2003/0168391. Such separation vessels are large, heavy and maintenance sensitive. The separation process requires long residence times of the oil/water mixture in the vessel. Therefore, the inventory of such vessels is relatively large, which may create problems at the start-up, the closing down and any re-starts of such units.

There is a drive to achieve oil and water separations in devices that are more compact than the traditional gravity based equipment and in a faster way. In addition to the above there is also a need to make a bulk separation in which the major part of oil or water is separated from the mixture in a compact device followed by an additional step in which the separation in the single components is further improved.

SUMMARY OF THE INVENTION

The present invention now, overcomes the disadvantages of the prior art equipment. The separation is carried out in in-line separators. These separators are small and light weighted when compared with the prior art equipment. A fast separation is obtained using high centrifugal forces. Optimum separation is obtained using one or more additional entrances for the oil/water mixture to be separated and/or by using adjustable vortex generating equipment. More especially, additional oil/water mixtures are axially or tangentially introduced into the separator device. The same improvement can be obtained may adjusting the vortex generating means. Also both measures can be used. In addition, the above described measures will improve the turndown of the separator.

The present invention now relates to a process for the separation of an oil/water mixture into an oil rich phase and a water rich phase using an inline separation device, the process comprising: providing an oil/water supply pipe, providing an elongated, tubular separation device comprising successively an inlet, a vortex generating chamber, a central separation chamber and an outlet and providing an oil rich phase discharge pipe and a water rich phase discharge pipe, the inlet of the separation device fluidly connected with the oil/water supply pipe and the vortex generating chamber, the central separation chamber fluidly connected with the vortex generating chamber and the outlet of the separator, the outlet further fluidly connected with the oil rich phase discharge pipe and the water rich phase discharge pipe, the vortex generating chamber provided with vortex generating means, the process further comprising the provision of an oil/water mixture via the oil/water supply pipe, introducing the oil/water mixture from the oil/water supply pipe into the vortex generating chamber, generating a rotating oil/water mixture which is passed on to the central separation chamber, separating oil and water in the separation chamber into an oil rich phase and a water rich phase and discharging the oil rich phase via the oil rich phase discharge outlet and the water rich phase via the water rich phase discharge outlet, the process further also comprising a) the provision of an additional tangential or axial inlet into the vortex generating chamber or the central separation chamber and introducing an additional amount of oil/water mixture tangentially and/or axially into the vortex generating chamber or the central separation chamber, or b) adjusting the vortex generating means to control the rotation of the vortex, or a combination of a) and b). The process suitably comprises adjusting the vortex generating means to control the rotation of the vortex, with the proviso that in the process no micro-sized gas bubbles are introduced upstream of the outlet of the separation device at the periphery of the separation device.

BRIEF DESCRIPTION OF THE DRAWINGS

The invention will be described hereinafter in more detail and by way of example, with reference to the accompanying drawings, in which:

FIG. 6 shows an inline separation device including control units.

DETAILED DESCRIPTION OF THE INVENTION

Figure 1:
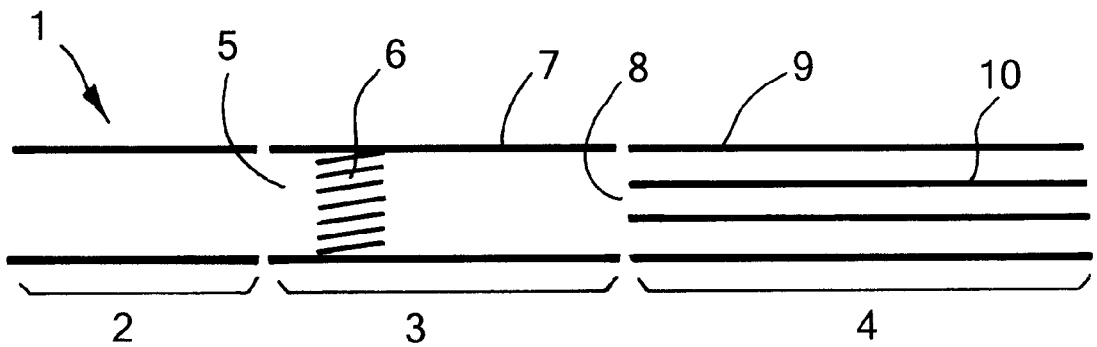
FIGS. 1 to 4 schematically show side views of devices for separating a mixture of oil and water.

In the process of the invention the separation is not based on gravity, but on centrifugal forces. The process can be used for a more or less complete separation, but is preferably used for bulk separation of oil from an oil/water phase or, more preferably, for the separation of an almost clean water phase, e.g. less than 5 wt % oil phase in the separated phase, from an oil/water mixture. Using a two step process a water phase may be obtained containing less than 1 wt % oil. Thus, a large amount of one phase is separated from a phase containing the other component as well as a minor amount of the first phase. Especially water is removed from an oil/water mixture. If necessary, the water may be removed in two or more stages.

In addition to the above, the process according to the present invention only uses piping components. The internal diameter of the tubular separation device is of the same order of magnitude as the oil/water supply pipe, e.g. between 0.5 and 2.0 times the size of the diameter of the supply pipe, especially substantially equal to the oil/water supply pipe. This result in a considerable decrease of weight of the device, while also the inventory is much lower. Thus, space requirements are much less severe, while also a lighter foundation can be used. Rather than only piping components, some parts of the device may be manufactured from conical parts. In that case especially the inside part of the element may be conical shaped. Further, the smaller device requires less maintenance and inspection than large gravity based settlers need. In addition, maintenance and inspection standards for settler tanks are more severe than pipeline based equipment. Further, the process of the present invention, using high g-forces, will result in a fast separation when compared with gravity based processes.

The present invention is able to separate almost all oil/water mixtures. Suitably, the mixture contains between 10 and 99 wt % water (based on total mixture), preferably between 40 and 98 wt % water, more preferably between 60 and 97 wt %. In addition, some sand, e.g. up till 1 or even up till 2 wt % (based on total mixture) may be present, although preferably all sand is removed before the separation. Any sand particles usually will end up in the water phase. Further, the oil/water mixture further may comprise an amount of gas, preferably an amount of gas up till 10 vol % of the total volume, more preferably up till 5 vol %, still more preferably up till 2 vol %. The gas fraction usually ends up in the oil rich phase.

Suitably, the oil/water mixture is a mixture produced from a subsurface reservoir. The process of the present invention is especially carried out at or close to the well site, more especially on the sea bed, or at an off-shore platform. The oil/water mixture may also be a refinery stream or a reaction product, e.g. a water/oil mixture produced in the Fischer-Tropsch reaction.

Suitably, the obtained water rich phase stream contains less than 20 wt % of oil, preferably less than 10 wt %, more preferably less than 1 wt %. Suitably, the oil rich phase contains at least 50 wt % oil, preferably at least 80 wt %, more preferably at least 90 wt %. It is preferred that the water stream is as clean as possible, thus making further separation steps unnecessary. Such a stream can be further treated in a biological waste water treatment. If necessary, the oil rich phase may be further dehydrated.

In the process of the invention, the additional oil/water mixture may be introduced at more than one place into the vortex generating chamber or the central separation chamber, either at the same distance from the inlet of the tubular separation device and/or at different distances from the inlet of the tubular separation device. The additional oil/water mixture is preferably introduced into central separation chamber. A preferred embodiment comprises an axial inlet through the vortex generating means (see also FIG. 2). Such an inlet does not disturb the separation process in the central separation chamber.

In the case of an axial inlet, the inlet is preferably coaxially with the elongated, tubular separation device. In that way the disturbance of the ongoing separation is minimal. In the case of a tangential inlet, the inlet is preferably close to the vortex generating chamber. Preferably the tangential inlet is perpendicular to the average flow direction in the separation device. There may be an angle of up till 60°, preferably 30°, with the axial direction. Such an angle will result in co-flow of the two streams. In that case the additional stream is introduced in line with the ongoing separation, and the disturbance is relatively small. It is observed that several combinations of additional inlets may be used.

In the process of the present invention it is preferred to use an additional tangential or axial inlet into the vortex generating chamber for introducing an additional amount of oil/water mixture in combination with fixed vortex generating means.

The amount of the additional oil/water mixture which is introduced may be varied over the time. This will depend on one or more input variables as oil/water ratio, temperature, pressure, salt concentration in the water phase, droplet size, separation efficiency, flow rate, separation regime etc. Also the amount of oil/water that is introduced via the oil water supply pipe may vary over the time. In the case that the two (or more) streams originate from the same source, the flow split as well as the total amount may vary over the time. In general, there will be a central controlling unit, that, depending on the input variables and the separation obtained, will control the volumes of oil/water mixture to the several inlets of the separation unit and the amounts of oil/water and water/oil that is withdrawn from the unit. In this way also the turndown of the separator will improve.

The total amount of additional oil/water mixture may vary over a wide range, and is suitably between 10 and 1000 wt % of the first oil/water mixture, preferably between 20 and 500 wt %, more preferably between 30 and 300 wt %.

The desired separation may also be obtained by a method in which the vortex generating means are adjustable vanes, the adjustments being possible either from the inside of the separation device or from the outside of the separation device, e.g. by electrical or mechanical drivers. Similar adjustment mechanisms are known from adjustable static mixers.

It is observed that vanes generate a Rankine vortex with high tangential speed near the core, whilst tangential inlets generate high speed on the outer wall. By changing the flow rates arbitrary flow fields may be induced. Note that for oil in water dispersions a Rankine vortex may be favourable for separation (high g-force near core) whilst for water in oil dispersions a tangential inlet (high g-force near the pipe wall) may be more favourable. Vanes shaped in a certain way and adjustable to induce a Rankine vortex where the c factor (or the radial location of the maximum tangential velocity) is optimized in a specific area may be used to obtain an optimum separation. The vortex generating chamber may comprise a central body, the vortex generating means preferably arranged between the central body and the wall, the central body preferably having a streamlined shape, e.g. a bullet shaped form. Also a combination of vanes and vanes/central body may be used.

In the present invention the separation device, or parts of the separation device, may have a tapered shape or a conical shape. It may be preferred that only the inside of the relevant elements do have a conical shape, while the outside has a tubular shape.

The separation process may be carried out in a wide range of conditions, and is suitably carried out at a temperature between −10° C. and 150° C. in the separation chamber, preferably between 0 and 120° C., more preferably between 20 and 100° C., and at a pressure in the oil/water supply pipe between 1 and 500 bar, preferably between 5 an 350 bar, more preferably between 10 and 250 bar.

In a preferred embodiment, the oil/water mixture is mixed or uniformly dispersed before introduction into the separation device. The mixing process preferably is a low-energy mixing process to avoid the formation of emulsions/dispersions.

Suitably, the amount of water rich phase and oil rich phase obtained in the separation is regulated by creating a pressure difference between the pressure in the water rich phase discharge pipe and the oil rich phase discharge pipe, preferably a process in which the flow split is the same as the oil/water ratio, more preferably in which the split is obtained by regulation of the pressure differential ratio, i.e. the ratio of the pressure differential between inlet and oil rich phase discharge and the pressure differential between inlet and water rich phase discharge. Preferably, the pressure difference is up till 10 bar, preferably 5 bar, more preferably 2 bar. The pressure drop over the in-line separator is suitably between 1 and 25 bar, preferably between 2 and 5 bar.

In the process of the invention, the axial velocity of the oil water mixture at the inlet of the central separation unit is suitably between 0.1 and 10 m/s, preferably between 0.5 and 5 m/s, and the tangential velocity just after the vortex generating means is between 0.2 and 20 m/s, preferably between 1 and 10 m/s. The maximum centrifugal/centripetal acceleration expressed as g-force is suitably at least 2 g, preferably at least 20 g, more preferably 100-500 g at the inlet of the separation chamber.

The tubular separator is suitably a pipe having an internal diameter at the inlet which between 0.5 and 2.0 times, especially between 0.75 and 1.25 times, the size of the internal diameter of the oil/water supply pipe, preferably the same size. Usually the oil/water supply pipe, the elongated, tubular separation device and the discharge pipes will be co-axially arranged. In the case that bent pipes are used (e.g. the oil/water supply pipe in FIG. 2), the direction of the axis at the connection with the other unit will be coaxially. In the case of a tangentially inlet, the inlet will also coaxially be arranged with the other elements of the device. The oil/water supply pipe, the tubular separator and the oil/water discharge pipes may be connected to each other using all techniques known in the art. For instance, welding may be used, or flange connections. Also screw connections and clamping connections can be used.

In another embodiment, the oil rich phase and/or the water rich phase, preferably the water rich phase, is subjected to a second separation process similar to the process as described above. Further, the oil rich phase obtained in the process of the invention may be subjected to a separation polishing treatment to remove any remaining water phase.

To maximize the separation in the process of the invention, chemicals may be added to the oil/water mixture to improve the coalescence of oil droplets. These chemicals are known in the art. A static mixture may be used, optionally in combination with water injection. Also heating may be used.

Suitably, the first and the additional oil/water mixture originate from the same source, although also different sources may be used.

Usually, the process of the invention will comprise upstream and downstream monitoring instruments in order to steer the flow ratio's of the obtained products. In that way it is possible to maximize the separation efficiency of the process.

The invention further relates to a device to carry out the process as described above. Thus, the invention relates to a device for the separation of an oil/water mixture into an oil rich phase and a water rich phase, the device comprising an oil/water supply pipe suitable for introducing an oil/water mixture into the separation device, an elongated, tubular separation device comprising successively an inlet, a vortex generating chamber, a central separation chamber and an outlet and an oil rich phase discharge pipe and a water rich phase discharge pipe, the inlet of the separation device fluidly connected with the oil/water supply pipe and the vortex generating chamber, the central separation chamber fluidly connected with the vortex generating chamber and the outlet of the separator, the outlet further fluidly connected with the oil rich phase discharge pipe and the water rich phase discharge pipe, the vortex generating chamber provided with vortex generating means, the device further comprising one or more tangential or axial inlets, preferably tangential inlets, into the vortex generating chamber or the central separation chamber suitable for introducing an additional oil/water mixture and/or the vortex generating chamber provided with adjustable vortex generating means. The device suitably comprises a vortex generating chamber provided with adjustable vortex generating means, with the proviso that the device does not comprise micro-sized gas bubble introducing means upstream of the outlet of the separation device at the periphery of the separation device.

In a preferred embodiment, the invention concerns a device in which the vortex generating chamber comprises adjustable vanes in the flow direction of the mixture, the adjustments being possible either from the inside or the outside of the separation device, e.g. by electrical or mechanical drivers. More especially, the vortex generating chamber comprises a central body, the vortex generating means preferably arranged between the central body and the wall, the central body preferably streamlined. Preferably the separation device has a tapered or conical shape.

The device is suitably a tubular separator having an internal diameter which between 0.5 and 2.0, especially between 0.75 and 1.25, the size of the internal diameter of the oil/water supply pipe, preferably the same size.

To optimize the separation process, the separation device suitably comprises pressure reduction valves on the oil rich phase discharge pipe and the water rich phase discharge pipe to regulate the amount of fluidum from these outlets.

Especially, the central separating chamber may comprise a vortex finder, preferably the vortex finder being the oil rich phase discharge pipe.

The device as discussed above suitably comprises a water discharge pipe which is fluidly connected to the end of the central separating chamber and/or to the side of the central separating chamber.

The separation device may be positioned on the sea bed or at an off shore oil production platform.

In a special embodiment the device is mounted on a skid provided with means for lifting the skid and transporting the skid.

The device of the present invention suitably comprises an oil/water supply pipe which is in fluid communication with one or more wells for the production of oil, the device preferably also comprising a sand separator between the well and the oil/water separator.

Preferably, the device further comprises an mixer or homogenizer for pre-treatment of the oil/water mixture.

In addition, the device may comprise a gravity based separation device for a polishing treatment of the oil phase to remove any remaining water to required specifications.

The device as described above is especially used for the separation of oil/water mixtures.

Preferably, the process or device according to the present invention will not comprise bubble introducing means for introducing, upstream of the outlet of the separator and at the periphery of the separator, micro-sized gas bubbles into the fluid mixture flowing through the separator to enhance the separation of the immiscible fluid components of different gravities. Such bubble introducing means or any equivalent means are especially described in WO2007/074379, incorporated herein by references.

The invention will be described hereinafter in more detail and by way of example, with reference to the accompanying drawings, in which:

FIGS. 1 to 4 schematically show side views of devices for separating a mixture of oil and water.

Figure 5:
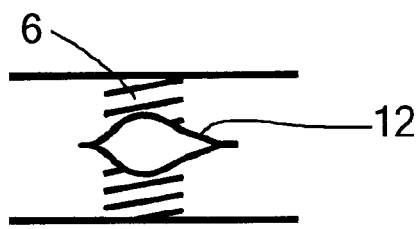
FIG. 5 shows a vortex generating chamber.

FIG. 5 shows a vortex generating chamber.

FIG. 6 shows an inline separation device including control units.

Referring to FIGS. 1 to 4, there are shown separation devices 1, each device comprising an oil/water supply pipe 2, an elongated tubular separation device 3 and outlet section 4.

Figure 2:
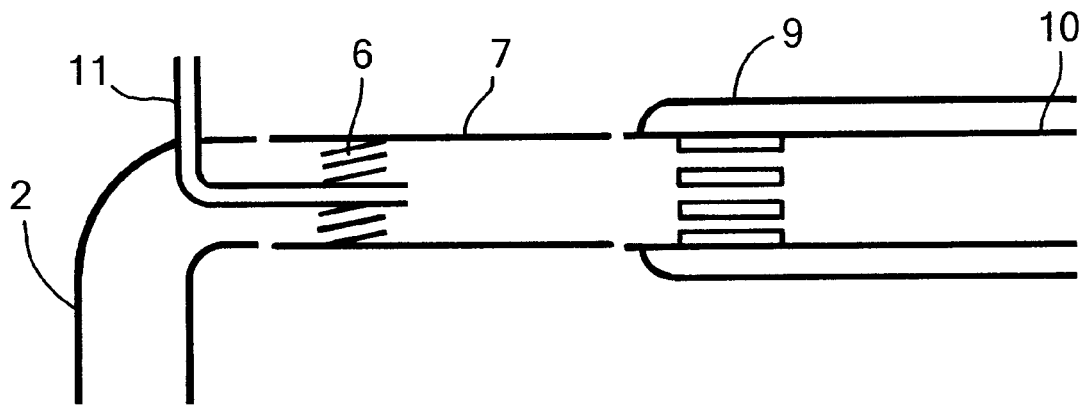
Figure 3A:
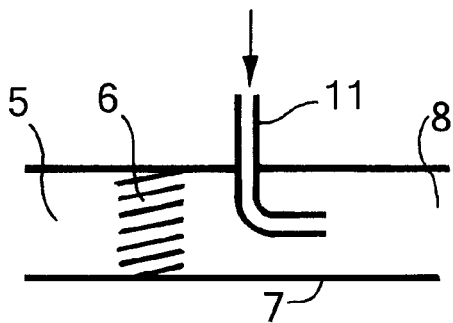
Figure 3B:
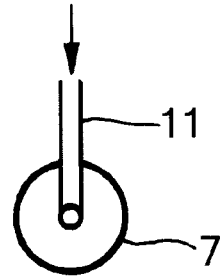
Figure 4A:
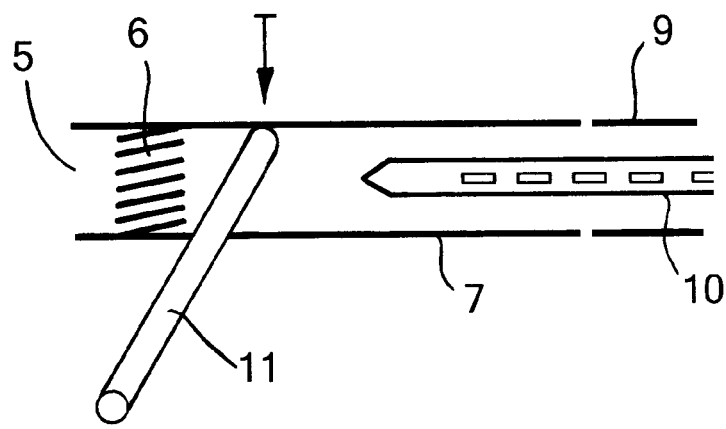
Figure 4B:
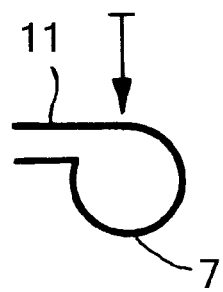
Figure 4C:
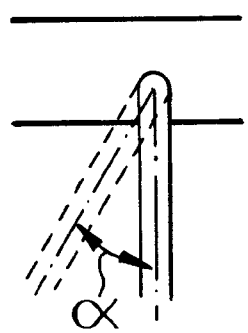

In all Figures the elongated tubular separation device 3 comprises an inlet 5 in fluid connection with oil/water supply pipe 2, a vortex generation chamber 6, a central separation chamber 7 and an outlet 8 in fluid connection with the outlet section. The outlet section 4 comprises a water rich phase outlet 9 and an oil rich phase outlet 10. In FIG. 1 vortex generating chamber 6 comprises adjustable vortex generating means. In FIG. 2 there is further shown an axial inlet 11, which introduces an additional oil/water stream via the vortex generating chamber 6 into the general separation chamber. The oil phase discharge pipe comprises slits through which the water rich phase flows into the water discharge pipe. In FIG. 3 there is shown an axial inlet 11, which introduces an additional oil/water stream into the central separation chamber 7. In FIG. 4a there is further shown a tangential inlet 11, which introduces an additional oil/water stream into the central separation chamber 7. In FIG. 4b a radial view is shown of the device shown in FIG. 4a at the point of introduction of the axial inlet 11. In FIG. 4b a possible angle between the tangential inlet and the axial direction is shown. The oil phase discharge pipe comprises slits through which the oil rich phase enters the discharge pipe. FIG. 5 shows a vortex generating chamber 6 provided with a central body 12. FIG. 6 shows an inline separation unit 1, an oil/water supply line 15, a separation unit 16 dividing the oil water supply into three streams, a central control unit 20 and controlling devices (mass flow controlling devices or devices to control differential pressure) 21 till 5. Device 19 measures at least the temperature, pressure, droplet-size, oil/water ratio of the incoming stream.

That which is claimed is:

1. A process for the separation of an oil/water mixture into an oil rich phase and a water rich phase using an inline separation device, the process comprising:
   providing an oil/water supply pipe, providing an elongated, tubular separation device comprising successively an inlet, a vortex generating chamber, a central separation chamber and an outlet and providing an oil rich phase discharge pipe and a water rich phase discharge pipe, the inlet of the separation device fluidly connected with the oil/water supply pipe and the vortex generating chamber, the central separation chamber fluidly connected with the vortex generating chamber and the outlet of the separation device, the outlet of the separation device further fluidly connected with the oil rich phase discharge pipe and the water rich phase discharge pipe, the vortex generating chamber provided with vortex generating means, the process further comprising the provision of a first oil/water mixture having an axial velocity via the oil/water supply pipe, introducing the first oil/water mixture from the oil/water supply pipe into the vortex generating chamber, generating a rotating oil/water mixture having a tangential velocity which is passed on to the central separation chamber, separating oil and water in the separation chamber into an oil rich phase and a water rich phase and discharging the oil rich phase via the oil rich phase discharge outlet and the water rich phase via the water rich phase discharge outlet, the process further also comprising
   a) the provision of an additional tangential or axial inlet into the vortex generating chamber or the central separation chamber and introducing an amount of additional oil/water mixture tangentially and/or axially into the vortex generating chamber or the central separation chamber, and
   b) optionally adjusting the vortex generating means to control the rotation of the vortex.

2. A process according to claim 1, which process comprises adjusting the vortex generating means to control the rotation of the vortex, with the proviso that in the process no micro-sized gas bubbles are introduced upstream of the outlet of the separation device at the periphery of the separation device.

3. A process according to claim 1, in which the oil/water mixture further comprises an amount of gas.

4. A process according to claim 1, wherein more than one of an additional tangential or axial inlet into the vortex generating chamber or the central separation chamber are provided; and the amount of additional oil/water mixture is introduced through the more than one additional inlets into the vortex generating chamber or the central separation chamber, wherein the additional inlets are at the same distance from the inlet of the tubular separation device or at different distances from the inlet of the tubular separation device.

5. A process according to claim 1, in which the amount of additional oil/water mixture is between 10 and 1000 wt % of the first oil/water mixture.

6. A process according to claim 1, in which the vortex generating means are adjustable vanes, suitably the adjustments being possible either from the inside of the separation device or from the outside of the separation device by electrical or mechanical drivers.

7. A process according to claim 1, in which the axial velocity of the oil water mixture at the inlet of the central separation chamber is between 0.1 and 10 m/s, and the tangential velocity just after the vortex generating means is between 0.2 and 20 m/s.

8. A process according to claim 1, in which the tubular separation device is a pipe having an internal diameter at the inlet which is between 0.5 and 2.0 times the size of the internal diameter of the oil/water supply pipe.

9. A device for the separation of an oil/water mixture into an oil rich phase and a water rich phase, the device comprising an oil/water supply pipe suitable for introducing an oil/water mixture into a separation device, an elongated, tubular separation device comprising successively an inlet, a vortex generating chamber, a central separation chamber and an outlet and an oil rich phase discharge pipe and a water rich phase discharge pipe, the inlet of the separation device fluidly connected with the oil/water supply pipe and the vortex generating chamber, the central separation chamber fluidly connected with the vortex generating chamber and the outlet of the separation device, the outlet of the separation device further fluidly connected with the oil rich phase discharge pipe and the water rich phase discharge pipe, the vortex generating chamber provided with vortex generating means, the device further comprising one or more tangential or axial inlets, into the vortex generating chamber or the central separation chamber suitable for introducing an additional oil/water mixture and/or the vortex generating chamber provided with adjustable vortex generating means.

10. A device according to claim 9, the device comprising a vortex generating chamber provided with adjustable vortex generating means, with the proviso that the device does not comprise micro-sized gas bubble introducing means upstream of the outlet of the separation device or at a periphery of the separation device.

11. A device according to claim 9, in which the tubular separation device is a pipe having an internal diameter which between 0.5 and 2.0 the size of the internal diameter of the oil/water supply pipe.

12. A device according to claim 9, in which the device comprises pressure reduction valves on the oil rich phase discharge pipe and the water rich phase discharge pipe to regulate the amount of fluid from these outlets.

* * * * *